United States Patent [19]
Bardmesser

[11] Patent Number: 5,986,992
[45] Date of Patent: Nov. 16, 1999

[54] DISK CARTRIDGE WITH PROGRAMMABLE LCD CAPACITY DISPLAY INDICATOR

[75] Inventor: George S. Bardmesser, Woodcliff Lake, N.J.

[73] Assignees: Sony America, Park Ridge, N.J.; Sony Corporation, Tokyo, Japan

[21] Appl. No.: 08/826,661

[22] Filed: Apr. 7, 1997

[51] Int. Cl.$^6$ ............... G11B 33/02; G11B 5/02; G11B 23/03; G11B 5/76

[52] U.S. Cl. .............. 369/77.2; 369/75.1; 369/75.2; 369/292; 360/133; 360/137

[58] Field of Search .................. 360/133, 137; 369/291, 292, 75.1, 77.2

[56] References Cited

U.S. PATENT DOCUMENTS

| | | | |
|---|---|---|---|
| 4,553,252 | 11/1985 | Egendorf | 377/15 |
| 4,996,681 | 2/1991 | Coco et al. | 369/273 |
| 5,159,182 | 10/1992 | Eisele | 235/492 |
| 5,235,586 | 8/1993 | Feamster et al. | 369/100 |
| 5,355,357 | 10/1994 | Yamamori et al. | 369/75.2 |
| 5,721,655 | 2/1998 | Thweatt | 360/137 |

FOREIGN PATENT DOCUMENTS

405109236   4/1993   Japan.

OTHER PUBLICATIONS

Disk/Trend Report: Removable Data Storage, p. sum–6, lines 11–17, Sep. 1995.

*Primary Examiner*—David L. Ometz
*Assistant Examiner*—Tod Kupstas
*Attorney, Agent, or Firm*—Jay H. Maioli

[57] ABSTRACT

A data storage cartridge having a display for displaying the storage capacity remaining on the cartridge. The display is driven by a controller and a power cell housed within the cartridge. Electrodes along an edge of the cartridge connect with electrodes within a data storage drive and information regarding the status of the cartridge is transferred to the controller. The controller and display are powered by a rechargeable cell. Current is provided to the electrodes to recharge the cell while the cartridge is in the data storage drive.

14 Claims, 11 Drawing Sheets

| DISK TITLE | VOL. # |
|---|---|
| CONTAINS:<br>　　FILE1.XXX<br>　　FILE2.XXX<br>　　FILE3.XXX<br>　　FILE4.XXX | LAST ACCESS<br>1/1/97 |
| | 300 M CAPACITY<br>175 M USED<br>125 M FREE |

DISK CARTRIDGE WITH PROGRAMMABLE LCD CAPACITY DISPLAY INDICATOR

BACKGROUND OF THE INVENTION

The present invention relates generally to the field of removable computer data cartridges. More particularly, the present invention relates to a disk cartridge wherein an integral display indicates the remaining storage capacity available on the cartridge.

Monitoring the storage capacity remaining on a conventional disk cartridge requires that the cartridge be inserted into a disk drive and accessed by a computer. Where a large number of cartridges are used, searching for a cartridge with adequate remaining capacity to store a file is cumbersome.

If a disk is selected that has slightly less remaining capacity than is required to store a large file, a "disk full" message may not appear until almost the entire file is written to the disk. For many applications, particularly using the MSDOS operating system, files may not span the end of a disk. Partially written files are therefore lost.

This problem is especially critical where files are transferred via modem. Large files take a significant amount of time to transfer and the entire file iady be lost if the transfer is interrupted before completion because the storage cartridge is full.

As the storage capacity and access speed of disk cartridges increase so does their cost. More efficient use of disk cartridges is desirable to reduce the overall cost of data storage.

A device has been proposed that would allow users to determine the remaining storage capacity on a computer disk without having to insert the disk into a computer. U.S. patent application No. 08/778,604 describes a disk cartridge with a mechanical pointer visible to the user. The pointer is positioned by a mechanical actuator located in the disk drive of a computer. As data is written to, or deleted from, the disk the actuator moves the pointer to indicate the storage capacity remaining on the disk. When the disk is removed from the disk drive the user can inspect the pointer to see how much space remains on the disk.

The above-identified system of suffers from several drawbacks. Impact to the disk housing many cause inadvertent movement of the pointer resulting in an incorrect capacity reading. The addition of mechanical parts to both the disk cartridge and the disk drive is undesirably complex, particularly in small notebook or palm-top computers where space is at a premium. Accurately judging the amount of storage capacity on a disk by the position of a small pointer is difficult.

SUMMARY OF THE INVENTION

In view of the aforementioned short-comings of known cartridge capacity display devices, it is an object of the present invention to provide a display device for displaying the remaining storage capacity of a data cartridge that is reliable, compact and mechanically uncomplicated.

It is another object of the present invention to provide a display device for displaying the remaining storage capacity of a data cartridge that will allow a user to quickly and accurately judge the amount of free storage space available on the cartridge.

It is yet another object of the present invention to provide a data cartridge incorporating a remaining storage capacity display that may be used with existing cartridge storage devices.

It is a still further object of the present invention to provide a data cartridge wherein a display device may be optionally attached.

According to a first aspect of the present invention there is provided a data disk cartridge with a circular storage disk housed within a rectangular housing. An LCD display is provided on a top surface of the housing. The LCD display is driven by a controller within a corner of the housing. A memory is connected to the controller for storing data about the status of the storage disk, including the remaining free storage capacity. The display, controller, and memory are powered by a cell also within the corner of the housing. When the disk cartridge is inserted into a disk drive, spring contacts on the edge of the cartridge housing make electrical connection with electrodes in the disk drive. Data regarding the status of the storage disk is transmitted to the controller from the disk drive via these electrodes. The data is stored in the memory. When the disk is removed from the disk drive the controller causes the display to continuously indicate the remaining storage capacity.

According to a second aspect of the present invention, there is provided a cartridge storage drive that can communicate status information to a status display apparatus housed within the data cartridge. The drive includes electrodes that contact spring connectors along an edge of the cartridge housing. Electrical signals sent to the electrodes communicate status information to the status display apparatus. Electrical power is also provided through the electrodes to charge a rechargeable power cell that powers the status display apparatus.

DETAILED DESCRIPTION

Figure 1:
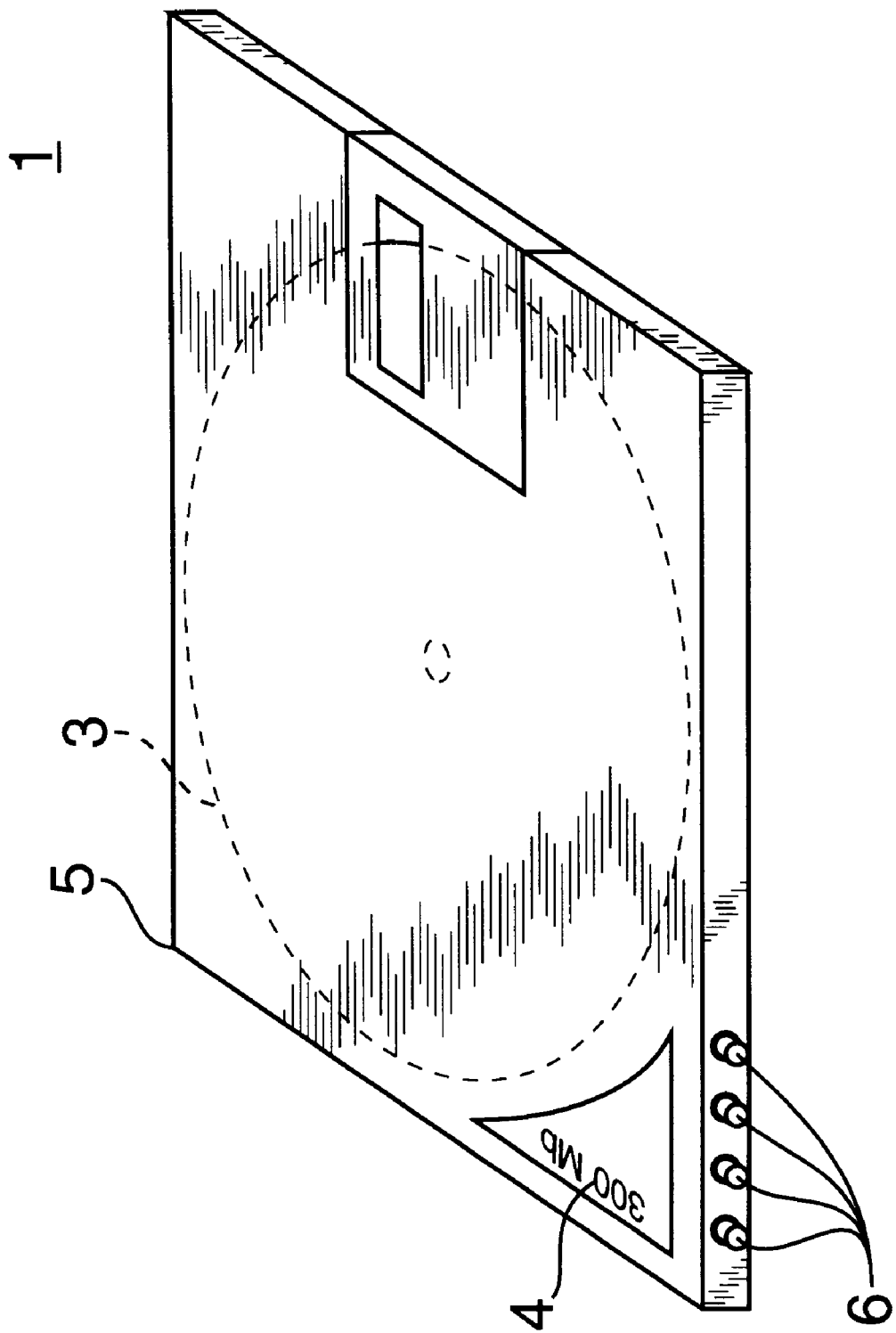
FIG. 1 shows a data storage cartridge according to a first embodiment of the present invention.

FIG. 1 shows a first embodiment of the present invention. A data disk cartridge 1 houses a storage disk 3 within a housing 5. Outside the circumference of the disk 3, on a top surface of the housing 5, is an LCD display 4. Along a side of the housing 5 are a number of spring electrodes 6.

Figure 2:
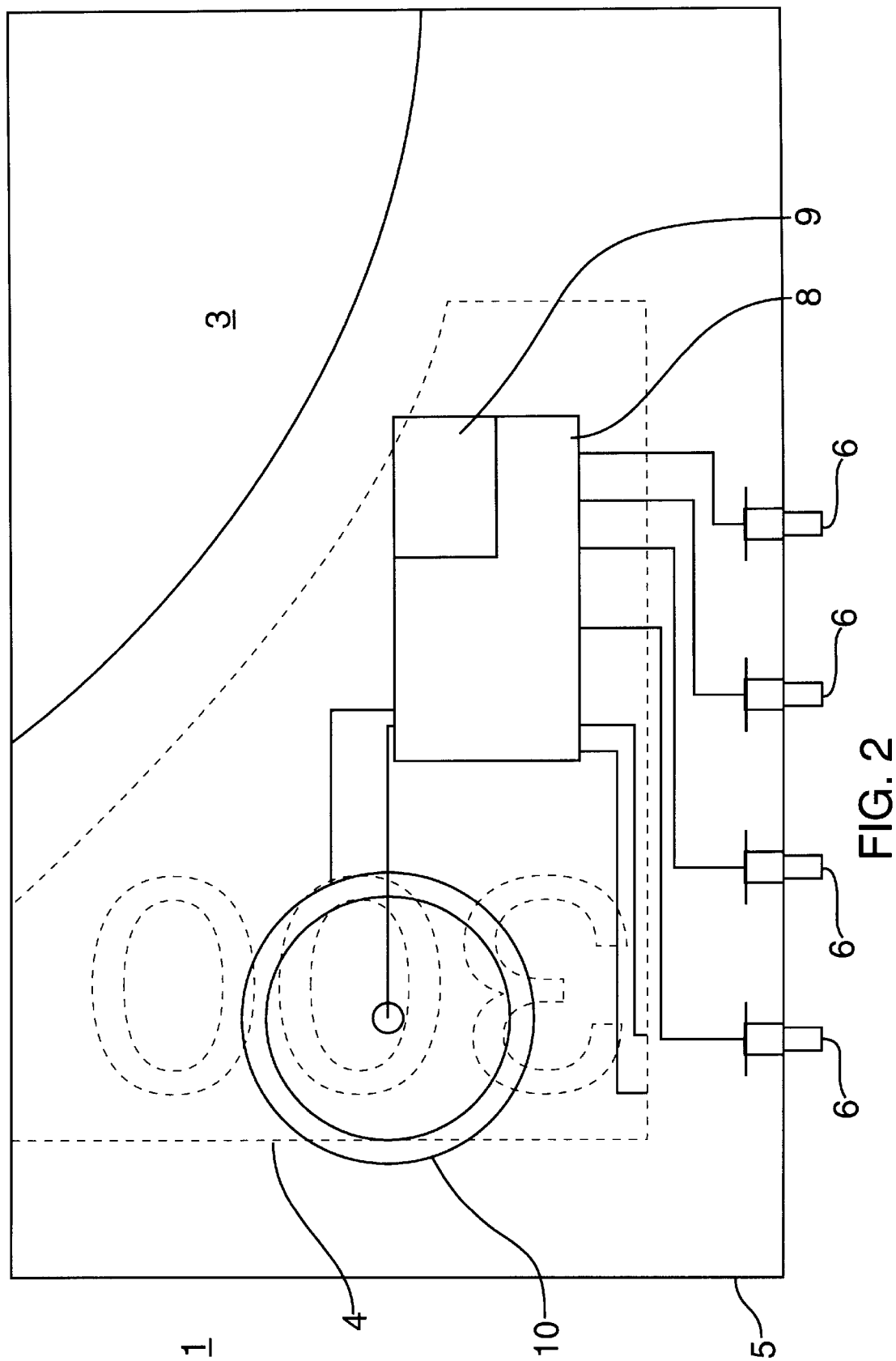
FIG. 2 shows a detailed view of the embodiment of FIG. 1.

FIG. 2 shows an interior view of a portion of the disk cartridge 1. A controller 8 and memory 9 are housed within a corner of the housing 5 outside the circumference of the storage disk 3. A power cell 10 is also housed in this corner of the housing 5. The display 4 is connected to the controller 8 as shown.

Electrical power from the cell 10 drives the controller 8 that in turn provides power to the display 4. Spring electrodes 6 along the edge of the housing 5 are also connected to the controller 8.

The cell 10 may be a rechargeable-type cell. If the cell 10 is rechargeable, then circuitry in the controller 8 provides a current path from the spring electrodes 6 to the cell 10 to allow the cell 10 to be recharged, as will be explained below.

Figure 3:
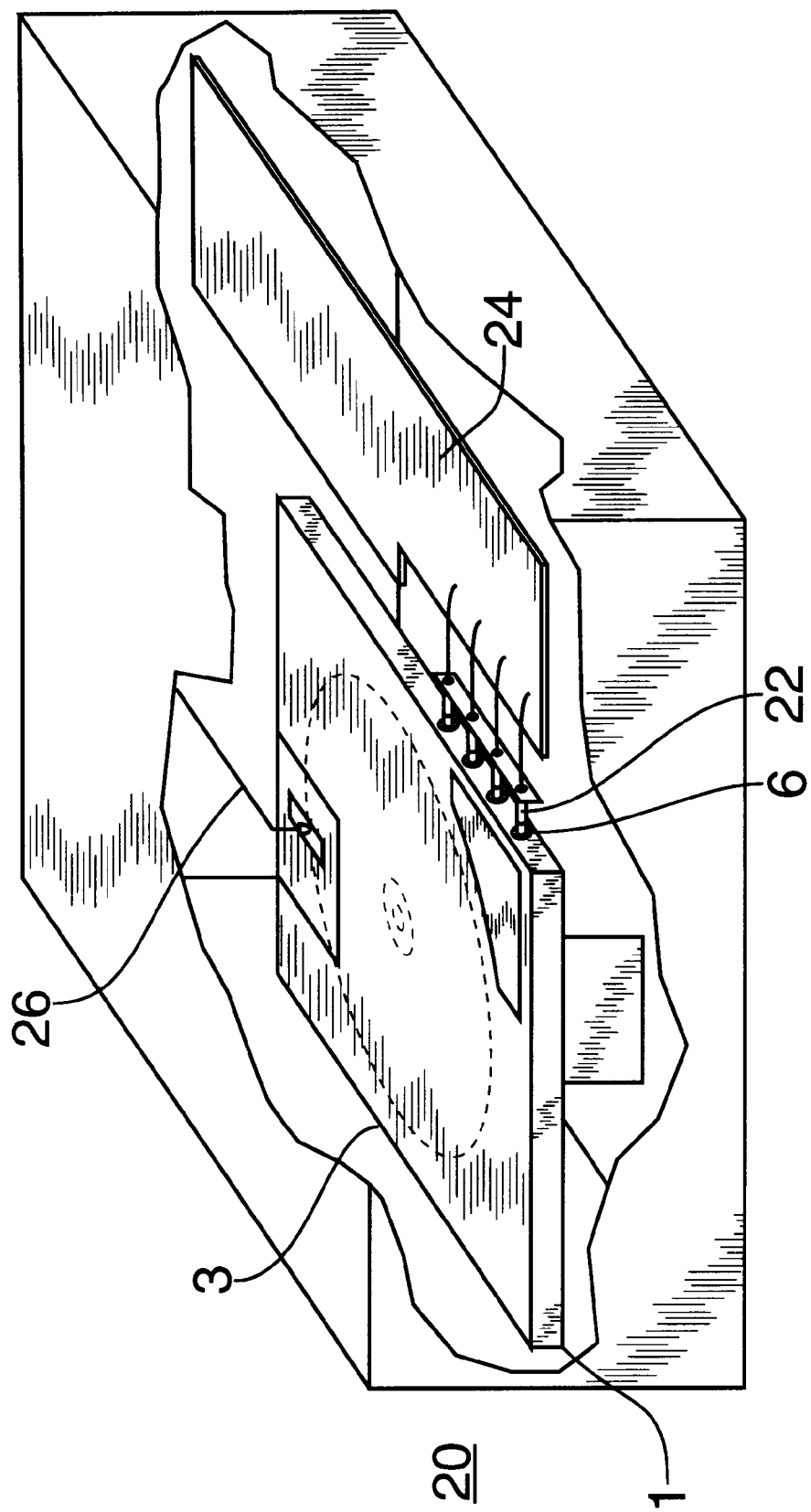
FIG. 3 shows a data storage drive according to the first embodiment of the present invention.

FIG. 3 shows the data disk cartridge 1 inside a disk drive 20. The electrodes 6 are in contact with contacts 22. The contacts 22 are connected to the disk drive controller circuit 24.

Data is written onto, read from, and deleted from the disk 3 by a head 26. Disk capacity data and instructions are communicated to the display controller 8 from the disk drive controller 24 through the contacts 22 and electrodes 6.

The disk cartridge 1 and disk drive 20 may represent any of a number of types of writable storage technologies. Such technologies include, but are not limited to, magnetic storage, optical storage, magnetooptical storage, WORM storage, Zip drives, and Digital Video Disk (DVD) technology.

Figure 4:
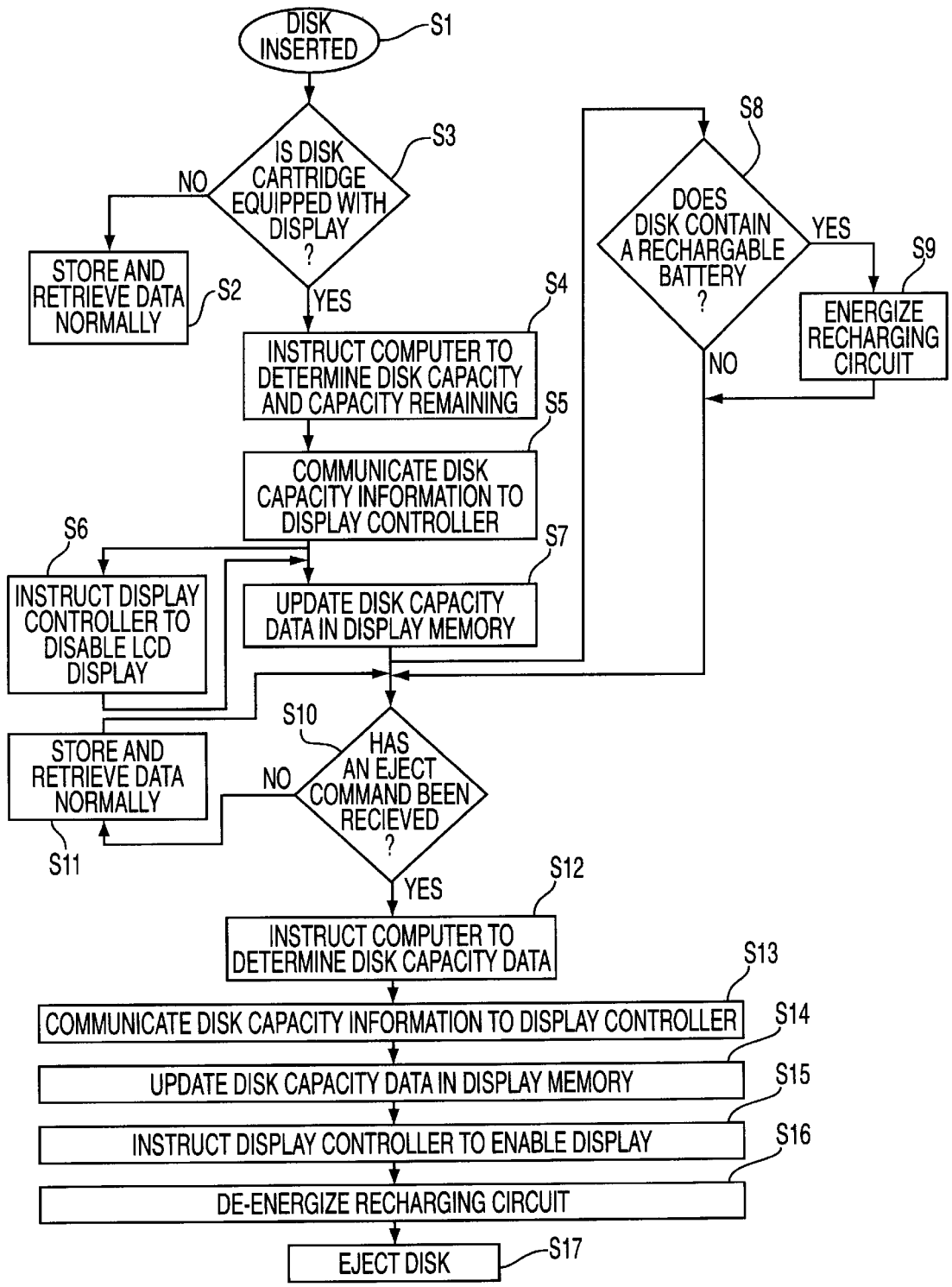
FIG. 4 is a flow chart illustrating the operation of the first embodiment of the present invention.

FIG. 4 is a flowchart explaining the operation of the disk drive 20. A disc cartridge 1 is inserted into a disk drive 20 at step S1. The disk drive controller 24 determines if the inserted disk 1 contains a capacity display controller 8 by sensing signals on contacts 22 at step S3. If no display controller is detected the process goes to step S2. The disk drive 20 processes the disk cartridge 1 in the conventional manner and no further signals are sent to the contacts 22.

If a display controller 8 is detected at step S3 the process proceeds to step S4. A computer or other data processing device (not shown) determines the capacity of the inserted disk cartridge 1 and the amount of unused capacity on the disk 3 by reading such information from a file allocation table on the disk 3 using the head 26. Disk capacity information is communicated to the display controller 8 in step S5 via the electrodes 6 and contacts 22.

In step S6 the display controller is instructed to disable the display 4. This is done to conserve power from the power cell 10 in the event the disk drive 20 is turned off for an extended period of time with the disk cartridge 1 inserted. In step S7 the disk capacity data is stored in the display memory 8.

In step S8 the disk controller 24 determines whether the power cell 10 is a rechargeable-type cell. If the cell 10 is rechargeable a recharging circuit is energized at step S9. Current is provided via the contacts 22 and electrodes 6 to charge the power cell 10.

In step S10 the disk controller 24 monitors whether an eject command has been received. If no eject command is received the disk controller stores, retrieves, and deletes data from the disk 3 via the write head 26 in step S11.

When an eject command is detected at step S10 processing proceeds to step S12. The disk controller 24 instructs the attached computer or other data processing device to determine the unused capacity of the disk 3.

In step S13 the disk controller 24 communicates this updated capacity data to the controller 8. The updated capacity data is stored in the display memory 9 in step S14. The display 4 is enabled in step S14. The recharging circuit is de-energized in step S16 and the disk cartridge 1 is ejected in step S17.

Figures 5, 6, 7:
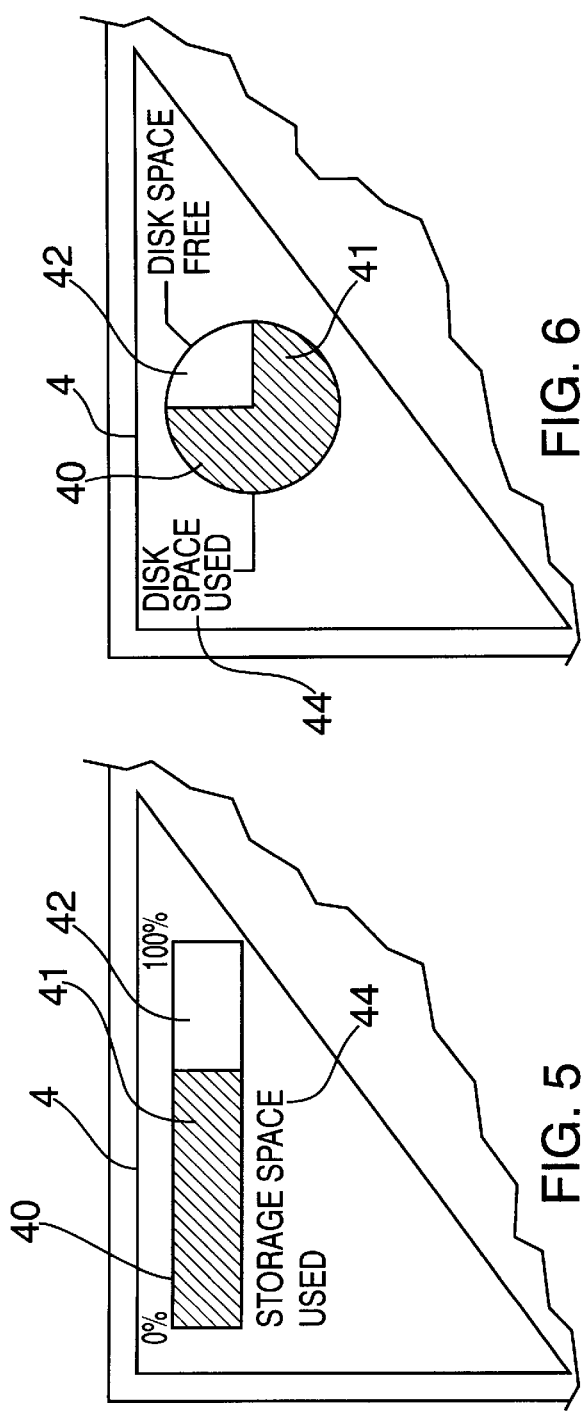
FIGS. 5, 6, and 7 show alternative display modes of a display according to the present invention.

FIGS. 5, 6, and 7 show alternative display formats for the display 4. FIG. 5 shows a Full/Empty gauge display. A darkened region 41 of a horizontal band 40 indicates the percentage of disk space currently occupied with data. A clear region 42 indicates the percentage of free space available.

FIG. 6 shows a pie chart display 40 where a darkened region 41 shows the fraction of disk space used and a clear region 42 shows a fraction of disk space available. Text 44 on the display 4 clarifies the meaning of the graphical figure 40.

FIG. 7 shows an alphanumeric format. Characters indicate the capacity of the disk cartridge 1 and the amount of storage space used and available.

Figure 8:
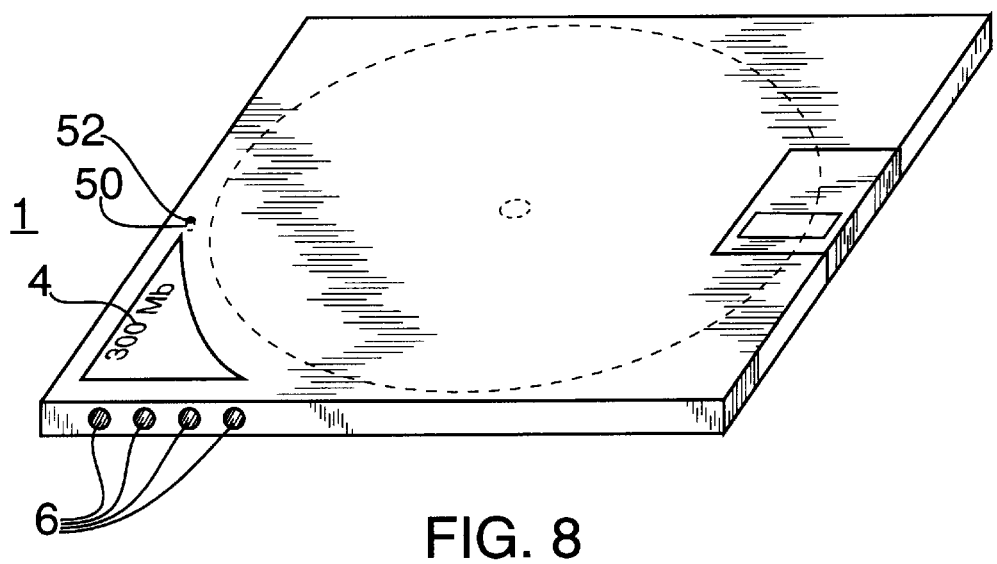
FIG. 8 shows a data storage cartridge according to a second embodiment of the present invention.

FIG. 8 shows a second embodiment of the present invention. Structures that are the same as those described in the first embodiment are designated by the same numerals.

A disk cartridge 1 has a size and shape that is identical to a conventional disk cartridge. The disk cartridge 1 may be, for example, a Zip disk. A display 4 is provided on a top corner of the cartridge 1. Along a side of the cartridge are electrodes 6 that are recessed below the surface of the edge of the cartridge 1.

On the top surface, near the display 4 is a recessed reset button 50. This button may be actuated by inserting a narrow point, for example a pencil point, into a recess 52 in the surface of the disk cartridge 1.

Figure 9:
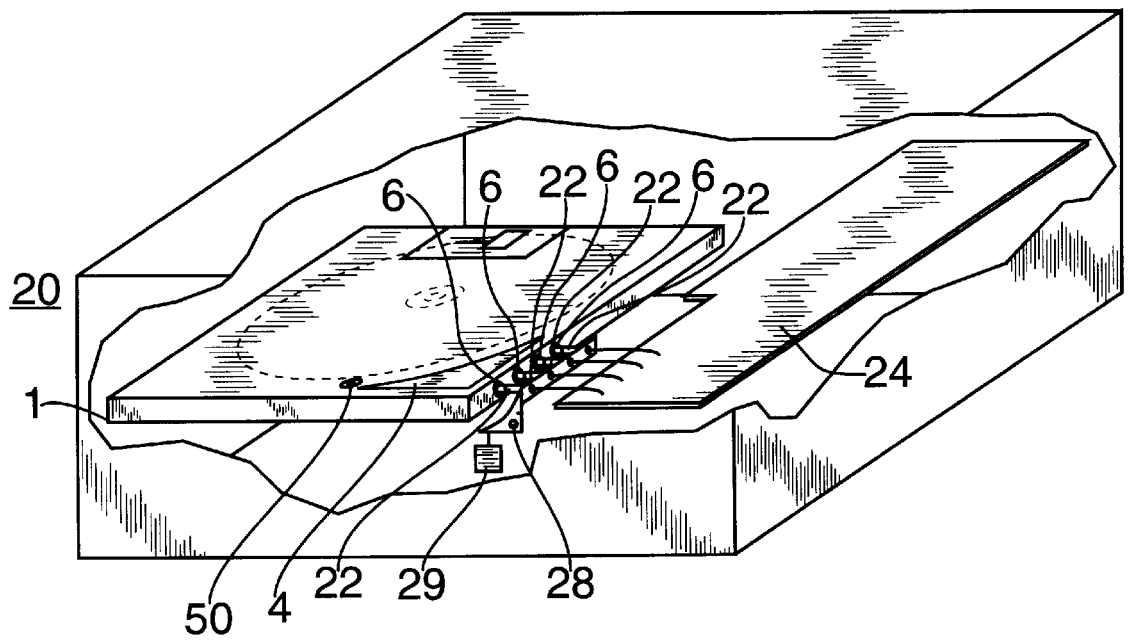
FIG. 9 shows a data storage drive according to the second embodiment of the present invention.

FIG. 9 shows the disk cartridge 1 inserted into a disk drive 20 according to the present invention. After insertion of the cartridge 1 an actuator 29 drives a cam 28 to move a set of pointed electrodes 22 toward the disk cartridge 1. The pointed electrodes 22 align with the recessed electrodes 6 along the edge of the cartridge. Contact is made between the pointed electrodes 22 and the recessed electrodes 6. The disk controller 24 communicates with the display controller 8 via the pointed electrodes 22 and recessed electrodes 6 as described in the first embodiment.

Figure 10:
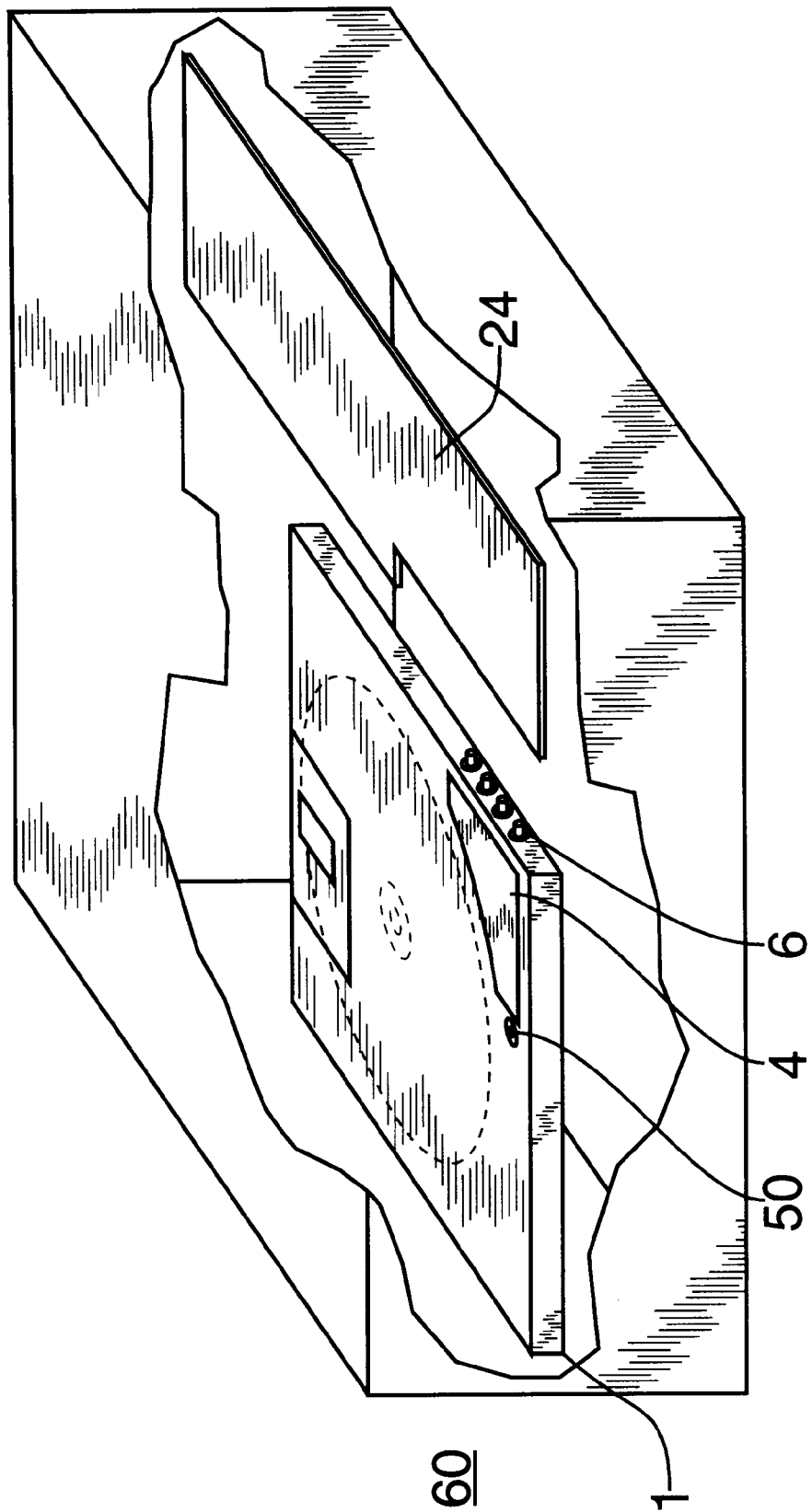
FIG. 10 shows a conventional data storage drive with the data storage disk shown in FIG. 8.

FIG. 10 shows the data cartridge 1 inserted into a conventional disk drive 60. Because the size and shape of the disk cartridge 1 is identical to a conventional cartridge and because the electrodes 6 and reset button 50 are recessed below the surface of the cartridge 1, the cartridge 1 functions compatibly with the drive 60, except that disk capacity data is not communicated to the display controller 8 and the display reading is meaningless.

By actuating the reset button 50, a user may configure the controller 8 to disable the display 4 so that the meaningless disk capacity information displayed as a result of using the disk cartridge 1 with a conventional disk drive 60 will not be displayed.

Alternatively, the reset button 50 may be actuated repeatedly to select one of a number of operating modes of the display 4 for use with a disk drive 20 according to the present invention. For example, one of the display formats illustrated in FIGS. 5, 6, and 7 may be selected using the reset button.

Figures 11, 12:
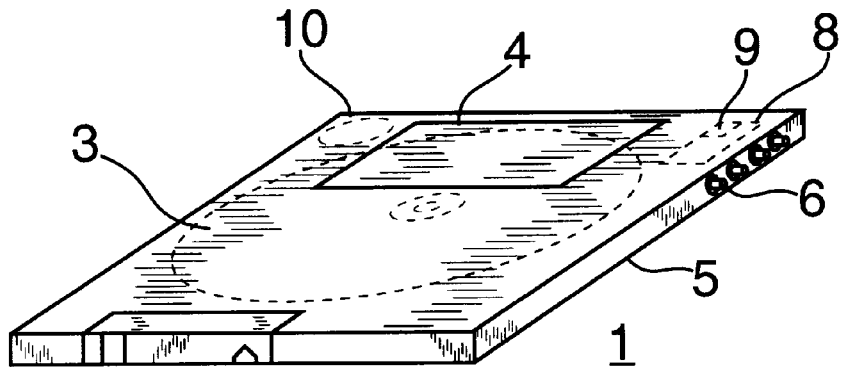
FIG. 11 shows a data storage cartridge according to a third embodiment of the present invention.
FIG. 12 is a detailed view of a display according to the third embodiment of the present invention.

FIG. 11 shows a third embodiment of the present invention. A disk cartridge 1 has a display controller 8 and memory 9 housed in a corner of a housing 5 outside the circumference of a storage disk 3. A power cell 10 is housed in a second corner of the housing 5. An LCD display 4 approximately 2"×2 ¼" is disposed on a top surface of the housing 5 in an area where a disk label would be displayed on a conventional disk. Electrodes 6 are disposed along an edge of the housing 5.

FIG. 12 shows a detailed view of the display 4 according to this embodiment. The display 4 is divided into a number of regions for displaying information regarding the data stored on the cartridge 1. For example, the disk title and volume, file names, the most recent access date, as well as remaining capacity information may be displayed.

Displayed information is generated by a computer (not shown) connected to a disk drive 20. The disk drive 20 communicates this information to the display controller 8 in the manner described with reference to FIGS. 1–4.

Figure 13:
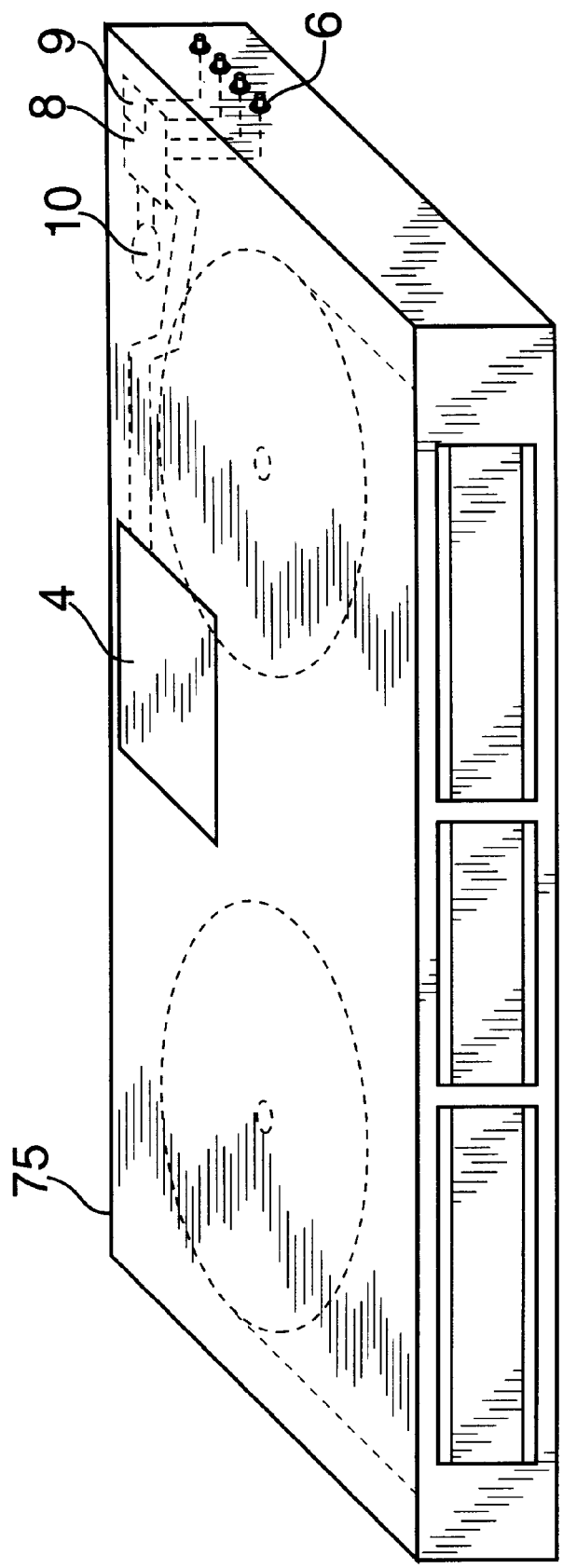
FIG. 13 show a tape cartridge according to a fourth embodiment of the present invention.
Figure 14A:
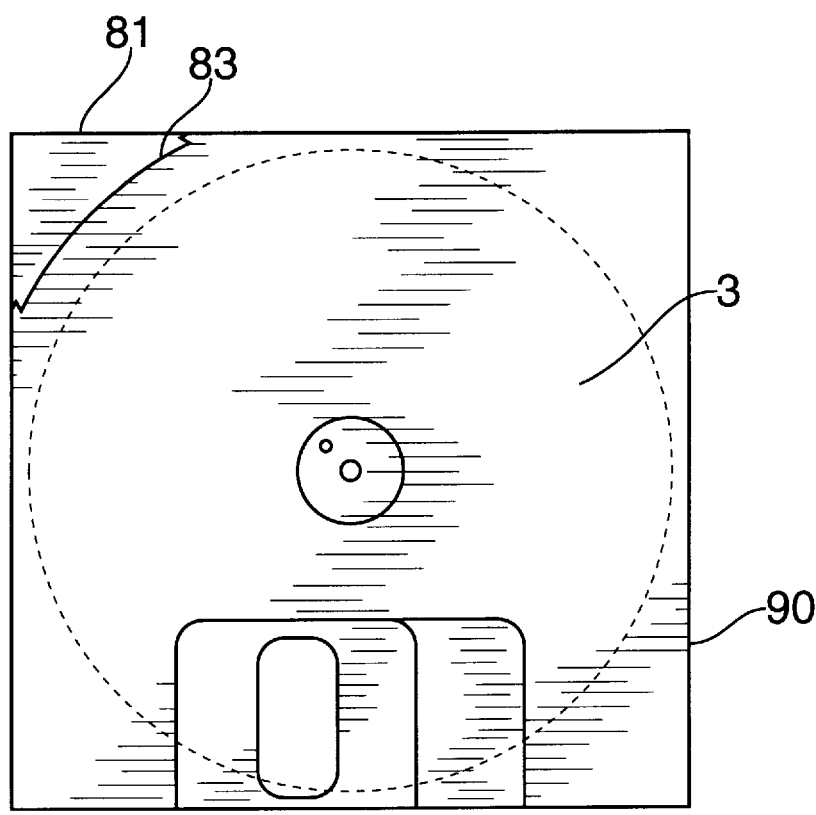
FIGS. 14(a), 14(b), 14(c) and 14(d) show a data storage cartridge according to a fifth embodiment of the present invention.
Figure 14B:
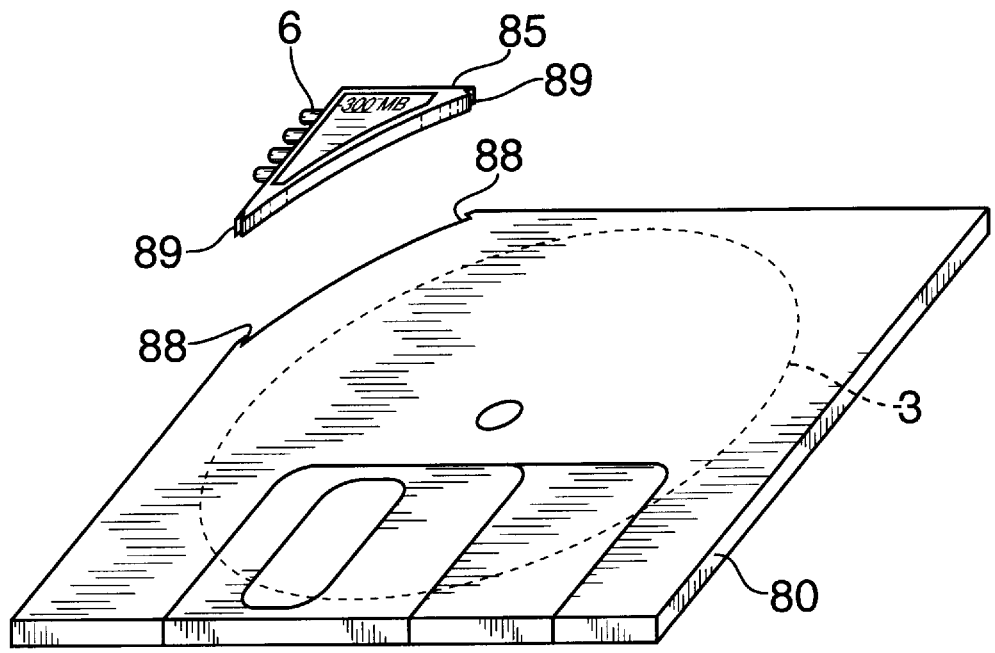
Figure 14C:
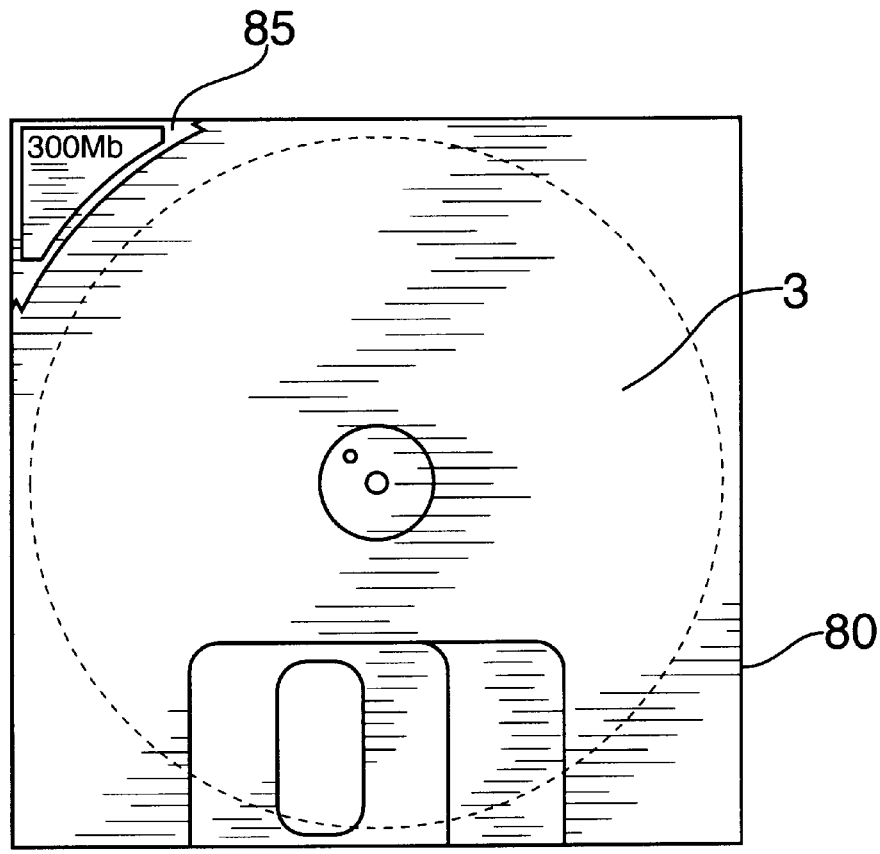
Figure 14D:
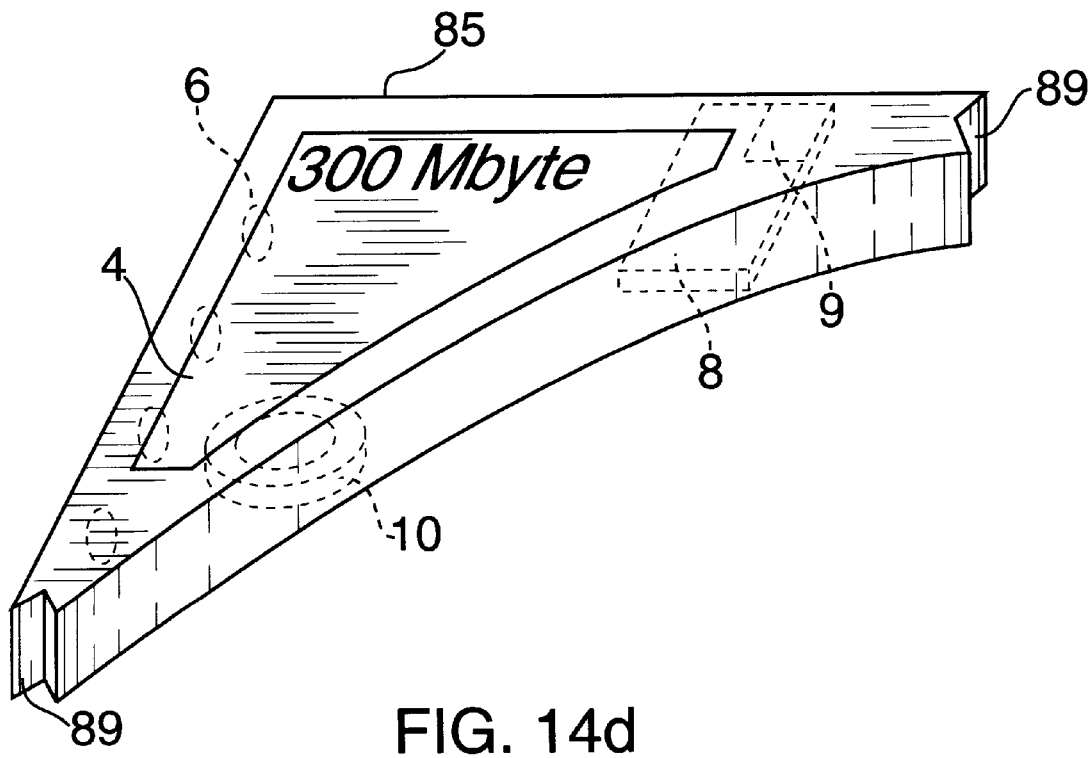

FIG. 13 shows a fourth embodiment of the present invention. A magnetic tape storage cartridge 70 is provided with a display 4 on a surface of a housing 75. Electrodes 6 are provided along a side of the housing 75. A display controller 8, memory 9, and power cell 10 are provided within a corner of the housing 75. Signals are transferred from a tape drive (not shown) to the controller 8 in the same manner as described in the first three embodiments.

FIGS. 14(*a*), 14(*b*), 14(*c*) and 14(*d*) show a fifth embodiment of the present invention.

A conventional data storage cartridge 80 shown in FIG. 14(*a*) has a removable corner 81. This cartridge 80 may be inserted into a disk drive 20 shown in FIG. 3, or a conventional disk drive 60 shown in FIG. 10, and data may be read from and written to the data storage medium 3 by the read/write head 26.

FIG. 14(*b*) shows the cartridge 80 with the corner 81 removed and a display module 85 positioned near the cartridge 80. The size and shape of the display module 85 are the same as the removable corner 81. Recesses 89 and protrusions 88 form an interference fit to hold the display module 85 securely to the cartridge as shown in FIG. 14(*c*).

FIG. 14(*d*) shows a detailed view of the display module 85. Electrical contacts 6, LCD display 4, display controller 8, memory 9, and power cell 10 all function in the manner described in the first embodiment.

The embodiments described above are illustrative examples of the present invention. It is to be understood that the present invention is not limited to these particular embodiments. Various changes may be effected by one skilled in the art without departing from the spirit and scope of the invention as defined in the appended claims.

What is claimed is:

1. A data storage system for transferring storage capacity data to a data storage cartridge having a capacity display device on a surface thereof, the system comprising:

cartridge accepting means for removably receiving said data storage cartridge and for ejecting said data storage cartridge, wherein said data storage cartridge includes:
 a cartridge housing,
 a data storage medium disposed within said cartridge housing for storing data,
 a display controller for receiving and storing said storage capacity data and for driving said display to display said storage capacity data including a remaining storage capacity of said data storage medium, and
 a plurality of interface electrodes connected to said display controller for receiving said storage capacity data;

a read/delete/write head for retrieving, deleting, and writing data to said data storage cartridge received in said cartridge accepting means;

cartridge display sensing means for sensing whether said cartridge display device is present in said data storage cartridge;

interface means for interfacing with said plurality of interface electrodes of said data storage cartridge and for receiving an eject command for ejecting said data storage cartridge by said cartridge accepting means; and control means for communicating said storage capacity data to said cartridge display device via said interface means when said eject command is received and when said cartridge display device is sensed by said cartridge display sensing means.

2. The data storage system according to claim 1, wherein said display controller includes:

a display driver for generating a signal to drive said display;

a memory for storing said storage capacity data to be displayed; and a power source for providing power to said memory, said display driver, and said display.

3. The data storage system according to claim 2, wherein said power source is a rechargeable cell and said interface means includes current transfer means for providing an electrical current to charge said rechargeable cell.

4. The data storage system according to claim 1, wherein said display is a liquid crystal display.

5. The data storage system according to claim 1, wherein said data storage medium is a magnetic disk.

6. The data storage system according to claim 1, wherein said data storage medium is a magnetic tape.

7. The data storage system according to claim 1, wherein said data storage medium is a magnetooptical disk.

8. The data storage system according to claim 1, wherein said data storage medium is an optical disk.

9. The data storage system according to claim 1, wherein said data storage medium is a Zip disk.

10. The data storage system according to claim 1, further comprising:

a manually operable button for setting a display mode of said display, said button being electrically connected to said display controller.

11. The data storage system according to claim 1, wherein said cartridge housing is formed with a removable corner segment, and said capacity display device is disposed on said removable corner segment.

12. The data storage system according to claim 1, wherein said control means turns off said capacity display device when said data storage cartridge is received in said cartridge accepting means, thereby saving power.

13. The data storage system according to claim 1, wherein said interface means includes a plurality of spring-biased electrodes.

14. The data storage system according to claim 13, wherein said data storage cartridge further includes a rechargeable cell, and said plurality of spring-biased electrodes includes a current providing electrode for recharging said rechargeable cell.

\* \* \* \* \*